(12) United States Patent
Altman et al.

(10) Patent No.: US 7,356,673 B2
(45) Date of Patent: Apr. 8, 2008

(54) SYSTEM AND METHOD INCLUDING DISTRIBUTED INSTRUCTION BUFFERS FOR STORING FREQUENTLY EXECUTED INSTRUCTIONS IN PREDECODED FORM

(75) Inventors: Erik R. Altman, Danbury, CT (US); Clair John Glossner, III, Carmel, NY (US); Erdem Hokenek, Yorktown Heights, NY (US); David Meltzer, Wappingers Falls, NY (US); Mayan Moudgill, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/845,693

(22) Filed: Apr. 30, 2001

(65) Prior Publication Data

US 2002/0161987 A1  Oct. 31, 2002

(51) Int. Cl.
G06F 9/30 (2006.01)
G06F 9/45 (2006.01)
(52) U.S. Cl. .................. 712/43; 712/213; 717/151
(58) Field of Classification Search ................ 712/213, 712/229, 43, 227, 233, 205, 206, 208, 209, 712/245; 717/140, 151, 152, 154, 158, 160
See application file for complete search history.

(56) References Cited

U.S. PATENT DOCUMENTS

| | | | | |
|---|---|---|---|---|
| 5,172,379 A | * | 12/1992 | Burrer et al. ............... 714/767 |
| 5,317,745 A | * | 5/1994 | Chan ........................... 710/264 |
| 5,615,375 A | * | 3/1997 | Ibusuki et al. ............... 710/264 |
| 5,638,525 A | * | 6/1997 | Hammond et al. .......... 712/209 |
| 5,742,782 A | * | 4/1998 | Ito et al. ...................... 712/210 |
| 5,794,010 A | * | 8/1998 | Worrell et al. ................ 703/20 |
| 5,896,522 A | * | 4/1999 | Ward et al. .................... 703/23 |
| 5,933,627 A | * | 8/1999 | Parady ......................... 712/228 |
| 6,085,314 A | * | 7/2000 | Asghar et al. ............... 712/213 |
| 6,223,254 B1 | * | 4/2001 | Soni ............................ 711/125 |
| 6,247,121 B1 | * | 6/2001 | Akkary et al. ............... 712/239 |
| 6,430,674 B1 | * | 8/2002 | Trivedi et al. ................. 712/43 |
| 6,453,407 B1 | * | 9/2002 | Lavi et al. ...................... 712/24 |
| 6,463,582 B1 | * | 10/2002 | Lethin et al. ................ 717/158 |
| 6,502,185 B1 | * | 12/2002 | Keller et al. ................. 712/213 |
| 6,625,756 B1 | * | 9/2003 | Grochowski et al. .......... 714/17 |
| 6,643,736 B1 | * | 11/2003 | Chen ........................... 711/117 |

OTHER PUBLICATIONS

Mike Johnson, "Superscalar Microprocessor Design," Prentice Hall, 1991.*
T. Ball and J. Larus, "Efficient Path Profiling," 29th Annual IEEE/ACM International Symposium on Microarchitecture, Paris, pp. 46-57, 1996.*

(Continued)

Primary Examiner—David J. Huisman
(74) Attorney, Agent, or Firm—F. Chau & Associates, LLC

(57) ABSTRACT

A system and method is provided for processing a first instruction set and a second instruction set in a single processor. The method includes storing a plurality of instructions of the second instruction set in a plurality of buffers proximate to a plurality of execution units, executing an instruction of the first instruction set in response to a first counter, and executing at least one instruction of the second instruction set in response to at least a second counter, wherein the second counter is invoked by a branch instruction of the first instruction set.

17 Claims, 4 Drawing Sheets

OTHER PUBLICATIONS

Hennessy and Patterson, "Computer Architecture—A Quantitative Approach, 2nd Edition," 1996, pp. 130 and 134.*

Hennessy and Patterson, "Computer Architecture—A Quantitative Approach, 2nd Edition," 1996, pp. 252-253.*

* cited by examiner

SYSTEM AND METHOD INCLUDING DISTRIBUTED INSTRUCTION BUFFERS FOR STORING FREQUENTLY EXECUTED INSTRUCTIONS IN PREDECODED FORM

BACKGROUND OF THE INVENTION

1. Field of the Invention

The present invention relates to the design of semiconductor processors, and more particularly, to processors which can execute two or more operations per processor cycle.

2. Description of Related Art

Modern computer processors have several independent execution units which are capable of simultaneous operation. However, the number of execution units which can actually do useful work (confirmed or speculative) is limited by the number of instructions issued per cycle and the logic in the instruction issue unit. The issue logic determines dependencies prior to sending the instructions to the execution units. For out-of-order processors, the issue logic limits the performance of the processor, while in-order processors are limited by the available instruction fetch bandwidth to the memory subsystem.

The use of very long instruction word (VLIW) instruction sets for in-order processors is one proposed solution to the issue logic limitation. However, use of a VLIW is accompanied by significant demands on the instruction fetch bandwidth to the memory subsystem.

Compressed VLIW instruction sets using format bits are also known in the art. Format bits can be used to reduce the size of code without compromising the issue width advantages of the VLIW format. Other proposed solutions for reducing the stored size of VLIW programs are known in the prior art, however, these systems require decompression of the code as well as full decoding of each of the resulting VLIW instructions.

For example, subset encoding for some part of a reduced instruction set computer (RISC) instruction set has been used in ARM® architecture based processors to reduce the size of instructions without reducing the issue width. A two instruction set processor in which the second instruction set is a proper subset of the first instruction set is one example of subset encoding. Each instruction set may be decoded by different instruction decoders, but executed on the same pipeline. This results in an instruction encoding of the second instruction set which includes fewer bits per instruction but which may be processed by the same instruction fetch/decode/issue logic as the primary encoding. However, the processor must decompress the encoded second instruction set and then perform a full decode on the decoded instruction, or provide an alternate decoder for the second instruction set.

Another proposed solution includes a processor which executes a complex instruction set computer (CISC) instruction set and a RISC instruction set by translating each into the same format control word which is sent to the pipeline execution resources. The format control word is the output of the instruction decoder, as in any conventional processor, and is not stored nor visible to software.

Some prior art systems have used modified instruction set encoding to increase the efficiency with which an instruction set can accomplish useful work. These encodings need a full instruction decoder to generate the controls for the execution resources and the pipeline connections between them. The alternate encoding uses the same pipeline template no matter which instruction format is used. The choice between which mechanism to use can be made by a compiler with a view of the source code and an execution profile. This compiler would need to analyze the execution profile and encode the instructions for the program into the different instruction formats based on execution performance and code size. In one proposed system, the code output from a compiler is formatted so that different routines may be in different instruction sets as directed by a programmer with the appropriate transfer between them. However, no known system or method exists for scheduling to different instruction sets based on performance and usage.

For processors (e.g., signal processors) which spend a significant percentage of execution time in small kernels, it would be desirable to have an instruction fetch/decode/execute mechanism and pipeline template which would permit increased use of the execution resources and eliminate the work associated with instruction decoding. Therefore, a need exists for a system and method including distributed instruction buffers holding a second instruction set.

SUMMARY OF THE INVENTION

According to an embodiment of the present invention, a method is provided for processing a first instruction set and a second instruction set in a single processor. The method includes storing a plurality of instructions of the second instruction set in a plurality of buffers proximate to a plurality of execution units, executing an instruction of the first instruction set in response to a first counter, and executing at least one instruction of the second instruction set in response to at least a second counter, wherein the second counter is invoked by a branch instruction of the first instruction set.

The instructions of the first form and instructions of the second form are generated by a compiler based on execution frequency. Instructions of the second form are more frequently executed than instructions of the first form.

Executing the control signals for the instruction of the second instruction set comprises de-gating a plurality of execution queues storing a plurality of control signals of the first instruction set, and pausing the fetching of the first set of instructions. Executing the control signals for the instruction of the second instruction set further includes addressing the control signals, of the instruction, in the buffers, and sequencing the addressed control signals to the execution units. The control signals of the second set of instructions are a logical subset of the control signals for the first instruction set.

Executing an instruction of the first instruction set may include fetching an instruction of the first set from a memory storing instructions of the first instruction set, decoding the instruction into a plurality of control signals, and issuing the control signals to the execution units. Each execution unit is associated with one buffer.

According to an embodiment of the present invention, a processor is provided for processing a first instruction set and a second instruction set. The processor includes a plurality of execution units which receive control signals, and a branch unit connected to an instruction fetch unit of the first instruction set and a sequencer of the second instruction set. The processor includes a decode unit which decodes instructions of the first instruction set into control signals for the execution units, and a plurality of buffers, proximate to the execution units, for storing decoded instructions of the second instruction set. The processor further includes a compiler which generates instructions of the first form and instructions of the second form based on execution frequency, wherein instructions of the second form are executed more frequently than instructions of the first form.

The sequencer, engaged by the branch unit, addresses the decoded instructions of the second instruction set stored in the buffers and sequences control signals of the second instruction set. The sequencer is connected to a plurality of gates connected between a plurality of execution queues for storing the control signals of the first instruction set and the plurality of execution units, the sequencer controls the gates. Each execution unit is connected to a buffer.

The branch unit switches the processor from the first instruction set to the second instruction set in response to an unconditional branch instruction of the first instruction set. The branch unit switches the processor from the second instruction set to the first instruction set in response to an unconditional branch instruction of the second instruction set. Alternatively, a switch bit in a buffer connected to the branch unit signals the sequencer to stop fetching from the buffers and enables instruction fetching in primary instruction memory, fetching the next instruction after the unconditional branch.

The execution bandwidth of the execution units is larger than the fetch/decode/issue bandwidth. The control signals of the second instruction set are a logical subset of the control signals of the first instruction set.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a system and method is provided for a processor which can execute at least two operations per processor cycle and the execution bandwidth is wider than the instruction fetch/decode/issue bandwidth used in processing programs developed by compilers which analyze the code to be run on the processor.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
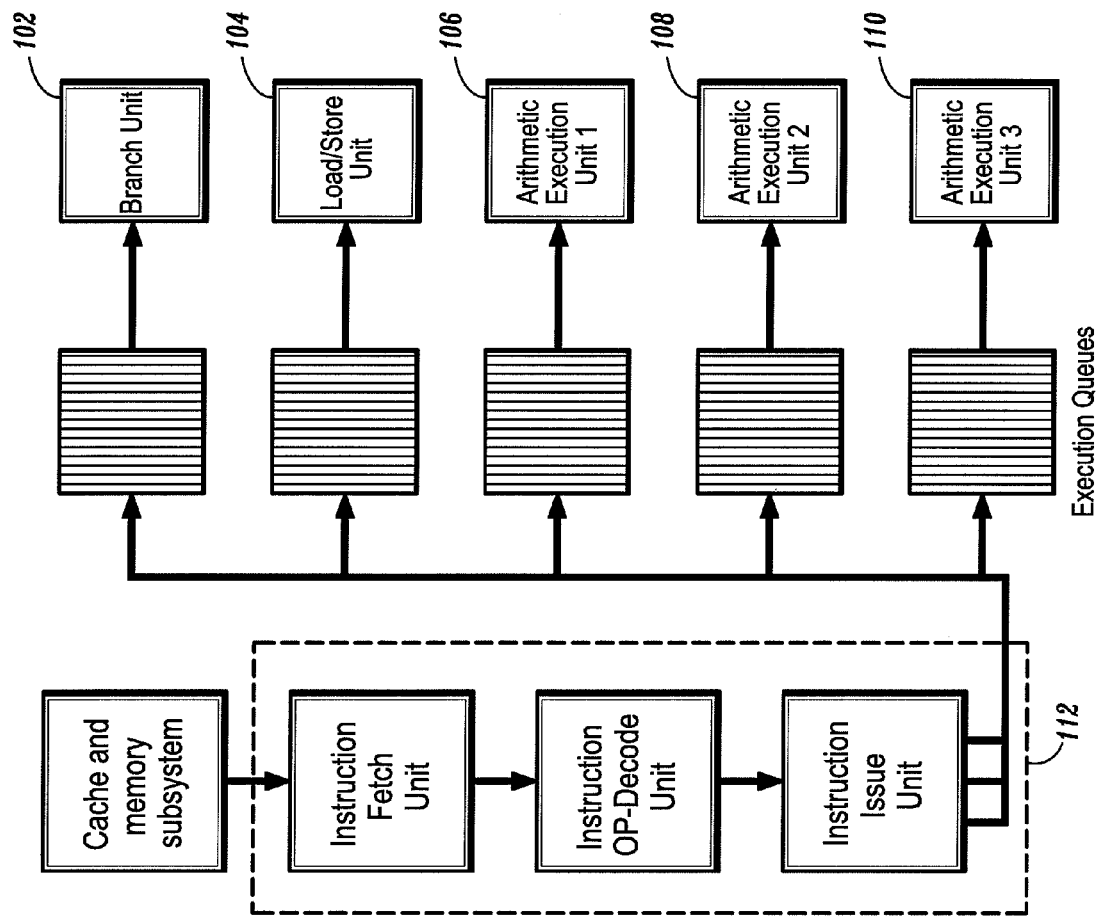
FIG. 1 shows an illustration of a multi-issue processor with an issue width of three and an execution width of five.

FIG. 1 shows a diagram of a prior art processor including five execution units 102 to 110 coupled to an instruction fetch/decode/issue complex 112 capable of issuing three instructions per cycle. Each execution unit includes hardware controlled by signals decoded from the instruction in the decode, issue and EXecute1 cycles and presented to the hardware in the EXecute1 cycle. (See FIG. 2.) The issue of instructions can be limited by any of several causes, depending on the design of the processor. For example, in a compound instruction processor, the instruction text length may be too short to encode the controls for five execution units. Thus, the processor may not realize the potential maximum number of instructions issued per cycle, e.g., three. Similarly, in a conventional RISC processor, a limitation in bandwidth between the memory/cache subsystem and instruction fetch unit, or from a limitation in the dependency scheduling mechanism in the issue logic, may limit the issue of instructions.

Figure 2:
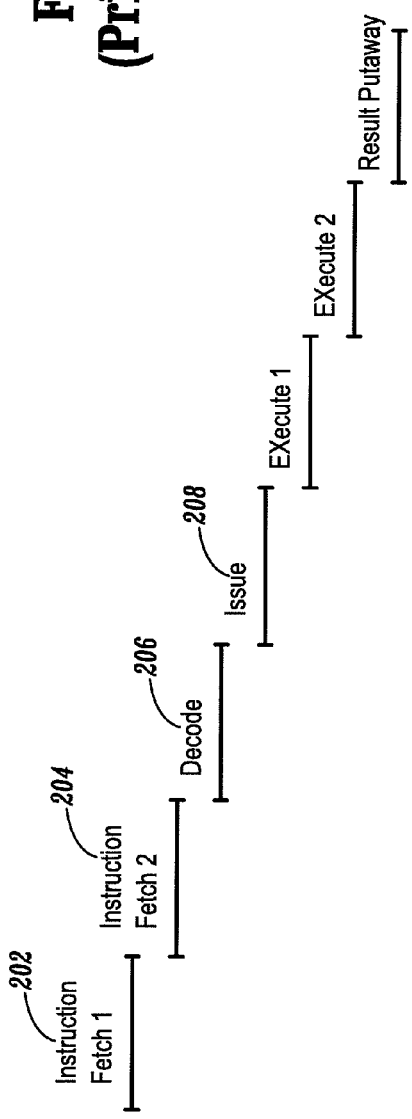
FIG. 2 shows a pipeline template according to the processor of FIG. 1 and a branch penalty without branch prediction.
Figure 2:
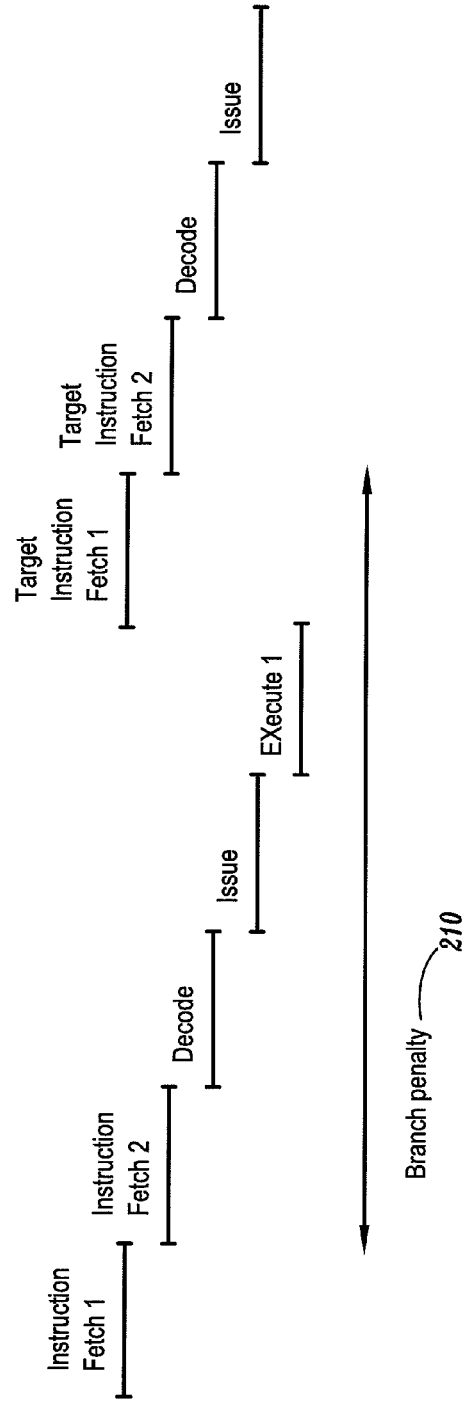

Irrespective of the particular limitation, such a design cannot achieve an instruction pipeline completion rate greater than three-fifths of the potential peak rate for the issue unit. For small loops which use all execution resources, such as a signal or video processing kernel, this results in a significant reduction in processor performance. FIG. 2 shows the pipeline characteristics of a processor in accordance with FIG. 1. The pipeline includes two cycles of instruction fetch 202 and 204, and separate decode 206 and issue cycles 208, totaling four cycles. FIG. 2 also shows the branch penalty associated with the pipeline length 210.

Figure 3:
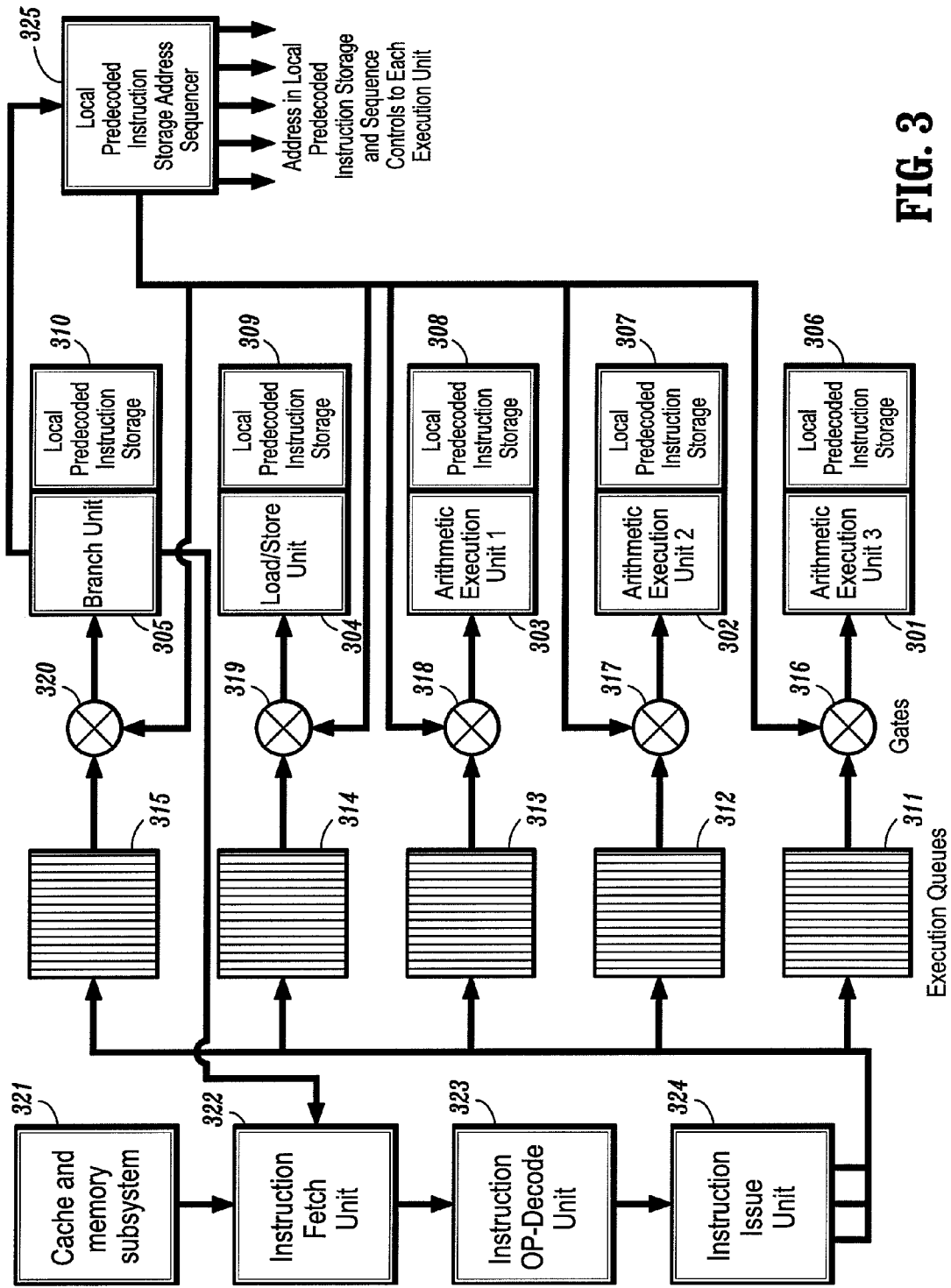
FIG. 3 shows a representation of a processor according to an embodiment of the present invention.

FIG. 3 is a diagram of a processor according to an embodiment of the present invention. The processor includes a decoder 323 for a primary instruction form stored in the primary instruction cache or memory 321. The processor also includes hardware for handling an alternate form of the instruction set stored in local predecoded instruction buffers 306-310. The alternate form of the instruction is generated by a compiler, or other means, as control signals (decoded instructions) such that each buffer includes a different set of control signals.

Instructions to be stored in the primary instruction memory 321 and decoded instructions (control signals) to be stored in the local predecoded instruction buffers 306-310 can be generated by the code assignment phase of a compiler. The compiler can target the two instruction formats and issue widths. Instructions of the second format contain one bit for each of the control signals generated by the instruction decoder of the first format. Because the second format includes the predecoded form of the first format, instructions of the second format will be wider, or include more bits, than instructions of the first format. The increase in instruction width may be accompanied by an increase in execution speed as described below. The compiler places decoded blocks of machine code (e.g., a small loop which is frequently accessed) into the local predecoded instruction buffers based either on static analysis or execution profiling.

Compilers which target two instruction sets in one machine are known in the art, e.g., compilers which target the ARM instruction set and the THUMB® instruction set. However, these compilers first attempt to put code into the THUMB code and when this fails, revert to the ARM code. According to an embodiment of the present invention, a compiler determines execution frequency for blocks of machine code using any or all of the following: hints provided by a user in the form of source code annotations understandable to the computer; static evaluation of the structure of the code to determine, e.g., inner loops as distinguished from outer loops; or execution profiling. Those blocks of code which are determined to be the most frequently executed and whose size allows them to fit within a local predecoded instruction buffer are stored therein in the second (predecoded) instruction format. The compiler continues to generate instructions of the alternate, decoded form until all available space in the local predecoded instruction buffers is occupied.

The local predecoded instruction buffers 306-310 are associated one-to-one, in close physical proximity, with each execution unit 301-305. Each local predecoded instruction buffer is statically loaded with decoded instructions (control signals) of the alternate instruction form. Because these local buffers are smaller than the primary instruction cache 321 and proximate to the execution unit, they can be accessed faster than the primary instruction cache 321. Proximity is a function of speed, in a processor according to the present invention, there is no significant logic delay in fetching the decoded instructions stored in the buffers for the execution hardware. Thus, a buffer may be located at a position spatially distant from the execution hardware, however, according to the present invention, a buffer-to-execution hardware pathway with no significant logic delay as compared to the primary instruction fetch mechanism is considered proximate. An alternate fetch/issue mechanism eliminates any instruction fetch bandwidth limitation.

Figure 4:
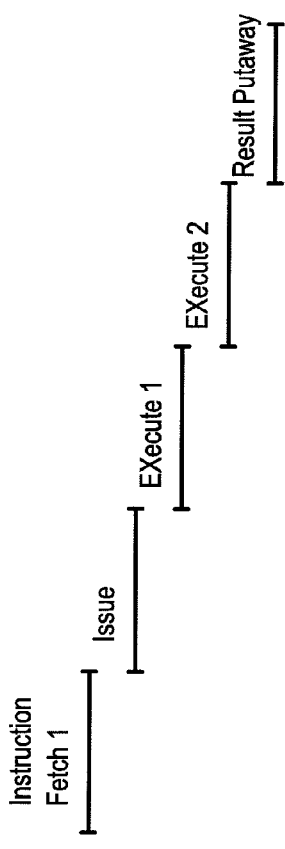
FIG. 4 shows a pipeline template according to the processor of FIG. 3 when executing from an execution local pre-decoded instruction buffer according to an embodiment of the present invention.
Figure 4:
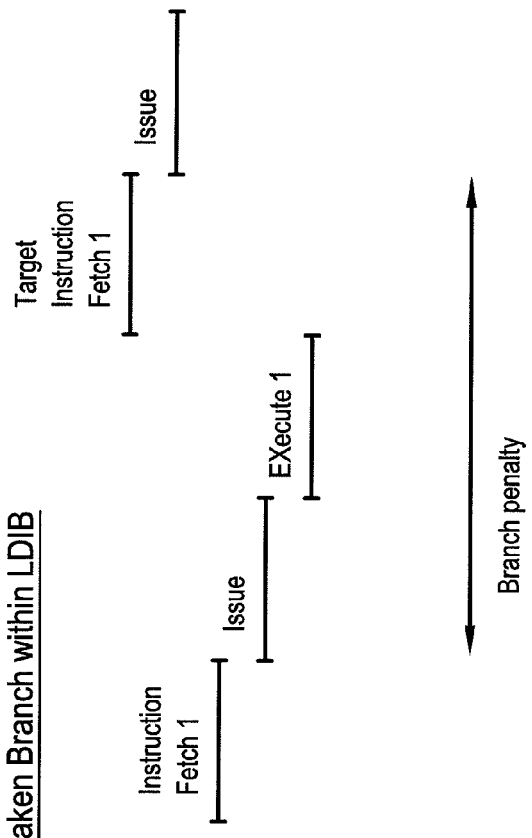

In a processor according to FIG. 3 the total pipeline length may be reduced by up to two cycles for predecoded instructions fetched from the local predecoded instruction buffers. FIG. 4 shows this pipeline stage reduction for a non-branch instruction. The instruction fetch has been reduced to one cycle due to the faster buffer access as compared to the primary instruction cache 321. The decode cycle has been eliminated since the contents of the local buffers are predecoded. FIG. 4 shows the pipeline stages for a taken branch instruction within the local decoded instruction buffers, for example, for a loop closing branch. Comparing this with FIG. 2 shows that the shorter pipeline has reduced the branch penalty, or the number of stages between issue of the branch and the issue of the target of the taken branch, by two. Therefore, high frequency sequences of instructions, as determined by the compiler, stored in the local predecoded instruction buffers, which may include looping code, execute in fewer cycles due to the reduction in branch penalty without the need for branch prediction and target prefetch mechanisms.

The processor also includes a branch unit 305. A program counter in the processor advances through the instructions in the primary memory 321. However, upon determining an unconditional switch branch instruction of the primary instruction form, the branch unit shifts the processor from the primary fetch/decode/issue mechanism 322-324 to the alternate mechanism for the alternate instruction form stored in the buffers.

A sequencer 325 is provided to control the fetching of the alternate instruction form because the addressing is different than that understood by the instruction fetch hardware 323. The alternate fetch/issue mechanism is embodied in the sequencer 325. The sequencer is invoked by an unconditional branch instruction (e.g., branch_to_C$) detected by the decode/issue/branch mechanism, 323/324/305, of the primary instruction form. The branch instruction suspends primary instruction fetch/decode/issue/execute functions and enables the alternate mechanism of the sequencer 325.

After the sequencer 325 is invoked, it switches a plurality of gates 316-320 prior to the execution units 301-305 for the primary instruction form, de-gating execution queues 311-315 of the primary instruction form. In addition, the branch unit 305 signals the fetch unit 322 to stop fetching instructions of the primary form from memory 321. The sequencer 325 includes an alternate program counter for directing the fetching of the decoded instructions. Further, the sequencer 325 sequences of the decoded instructions (control signals) from the local predecoded instruction buffers. Individual program counters can be implemented for each buffer to improve the efficiency with which the buffer space is used.

Because each execution unit is associated with its own buffer, a full complement of instructions (e.g., five) can be executed per clock cycle. In a processor according to FIG. 3, five instructions of the alternate form can be executed during each clock cycle. Thus, for the predecoded blocks of code (instructions), the potential instruction pipeline completion rate can be achieved.

An exit from the alternate instruction fetching can be signaled to the sequencer 325 by any of several means. For example, a switch bit in the buffer 310 local to the branch unit 305 may signal the sequencer 325 to stop fetching from the local predecoded instruction buffers 306-310 and enable instruction fetching in primary instruction memory 321, fetching the next instruction after the unconditional switch branch. Another example may include defining a RETURN_TO_NORMAL_FETCHING instruction in the buffer 310 which can behave as a branch to a designated instruction in the primary instruction memory 321. FIG. 4 shows the pipeline when fetching from the local buffer as well as the reduced branch penalty compared to the prior art.

Having described embodiments of a system and method for a distributed instruction buffer holding a second instruction form, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for processing a first instruction set and a second instruction set in a processor comprising the steps of:

providing a program of instructions comprising a plurality of instructions of the first instruction set and a plurality of instructions of the second instruction set, wherein the plurality of instructions of the first instruction set are decoded by a decoder in an execution pipeline and the plurality of instructions of the second instruction set are predecoded by a compiler, wherein the second instruction set is a logical subset of the first instruction set, and wherein the instructions of the second instruction set are control signals generated by the compiler and are not decoded during a runtime of the program;

storing the plurality of instructions of the second set in a plurality of buffers proximate to a plurality of execution units;

executing at least one instruction of the first instruction set in response to a first counter; and executing at least one instruction of the second instruction set in response to at least a second counter, wherein the second counter is invoked by a branch instruction of the first instruction set, wherein the step of executing at least one instruction of the second instruction set further comprises the steps of de-gating a plurality of execution queues storing the plurality of instructions of the first instruction set, and pausing a fetching of the first instruction set from a memory.

2. The method of claim 1, wherein the instructions of the first set and instructions of the second set are generated by the compiler, wherein instructions of the second set are statically loaded into the plurality of buffers as control signals ready for execution.

3. The method of claim 2, wherein instructions of the second set are more frequently executed than instructions of the first set.

4. The method of claim 1, wherein the step of executing at least one instruction of the second instruction set further comprises the steps of:

fetching at least one instruction of the second instruction set from a buffer of the plurality of buffers; and sequencing the at least one instruction of the second instruction set to the execution units.

5. The method of claim 1, wherein the step of executing at least one instruction of the first instruction set further comprises the steps of:

fetching an instruction of the first set form a memory;

decoding the instruction; and issuing the decoded instruction to at least one execution unit.

6. The method of claim 1, wherein a return to fetching of the first instruction set is signaled by a switch bit in a buffer of a branch unit storing instructions of the second set.

7. The method of claim 1, wherein a return to fetching of the first instruction set is signaled by a return instruction of the second instruction set stored in a buffer of a branch unit.

8. The method of claim 1, wherein each execution unit is associated with a different buffer of the plurality of buffers.

9. A processor for processing a program of instructions comprising instructions of a first instruction form and a second instruction form comprising:

a plurality of execution units for receiving instructions;

a branch unit connected to an instruction fetch unit for the first instruction form and a sequencer for the second instruction form, wherein the sequencer controls a plurality of gates connected between a plurality of execution queues for storing decoded instructions of the first instruction form and the plurality of execution units;

a decode unit for decoding instructions of the first instruction form into control signals for the execution units; and a plurality of buffers, proximate to the execution units, for storing predecoded instructions of the second instruction form, wherein the second instruction form is a logical subset of the first instruction form, wherein the predecoded instructions of the second instruction form are statically stored in the plurality of buffers, and wherein the predecoded instructions of the second instruction form are control signals generated by a compiler and are not decoded during a runtime of the program.

10. The processor of claim 9, wherein the instructions of the first form and instructions of the second form are generated based on execution frequency, wherein instructions of the second form are executed more frequently than instructions of the first form.

11. The processor of claim 9, wherein the sequencer, engaged by the branch unit, addresses the predecoded instructions of the second instruction form stored in the buffers and sequences predecoded instructions of the second instruction form to the execution units.

12. The processor of claim 9, wherein each execution unit is connected to a corresponding buffer of the plurality of buffers.

13. The processor of claim 9, wherein the branch unit switches the processor from the first instruction form to the second instruction form in response to a branch instruction of the first instruction form.

14. The processor of claim 9, wherein the branch unit switches the processor from the second instruction form to the first instruction form in response to a branch instruction of the secondinstruction form.

15. The processor of claim 9, wherein a switch bit in a buffer of the plurality of buffers connected to the branch unit signals the sequencer to stop fetching from the buffers and enables instruction fetching from a memory storing instructions of the first instruction form.

16. The processor of claim 9, wherein an execution bandwidth of the execution units is larger than a fetch/issue bandwidth of the first form.

17. A processor for processing a first instruction form and a second instruction form of an instruction set comprising:

a plurality of execution units for receiving instructions;

a branch unit connected to an instruction fetch unit for the first instruction form and a sequencer for the second instruction form, wherein the branch unit switches the processor from the first instruction form to the second instruction form in response to a branch instruction of the first instruction form and switches the processor from the second instruction form to the first instruction form in response to a branch instruction of the second instruction form;

a decode unit adapted to decode instructions of the first instruction form into control signals for the execution units;

an issue unit adapted to sequence decoded instructions of the first instruction form;

a plurality of buffers, proximate to the execution units, for statically storing predecoded instructions of the second instruction form, wherein the predecoded instructions of the second instruction form are not decoded during a runtime, and wherein each execution unit is connected to a corresponding buffer of the plurality of buffers; and the sequencer, engaged by the branch unit, adapted to fetch the predecoded instructions and sequence the predecoded instructions of the second instruction form, wherein the sequencer is connected to a plurality of gates connected between a plurality of execution queues adapted to store the decoded instructions of the first instruction form and the plurality of execution units, the sequencer further adapted to control the gates.

* * * * *